Oct. 4, 1960   E. QUINN   2,954,748
MACHINES FOR FASTENING STRIPS TO OTHER WORK
Filed Nov. 13, 1956   11 Sheets-Sheet 3
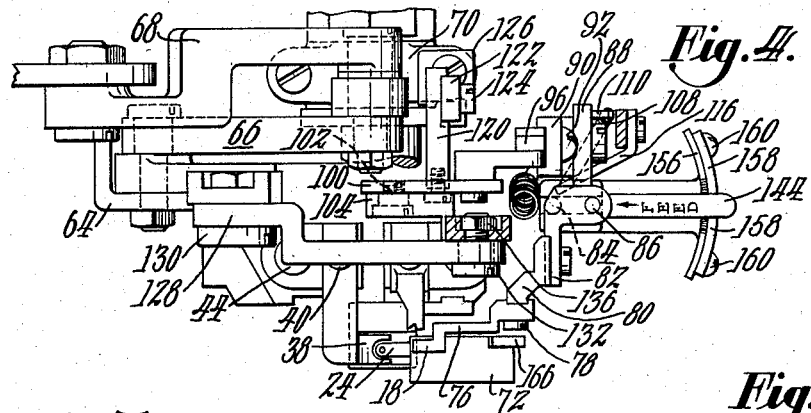
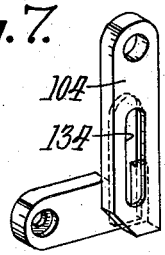
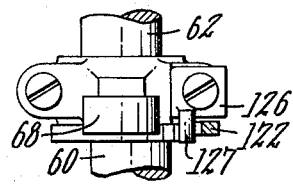
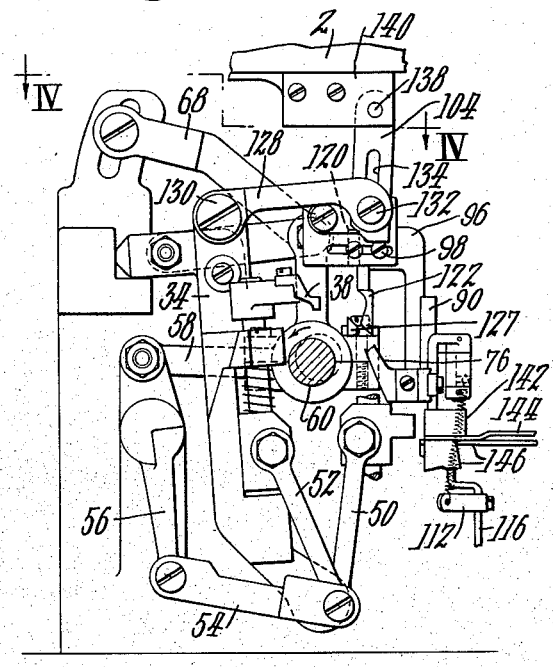
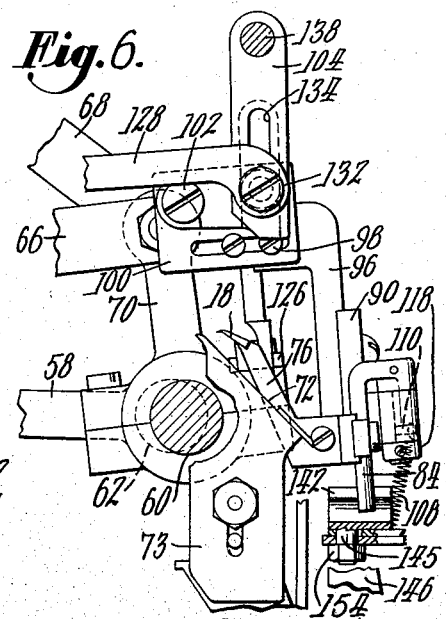
Inventor
Edward Quinn
By his Attorney

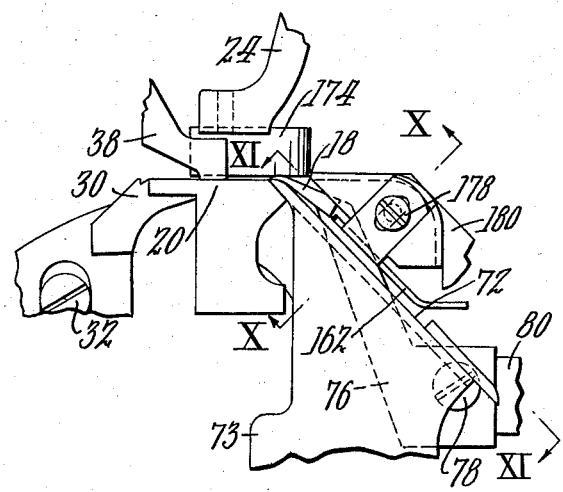
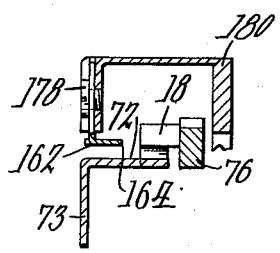
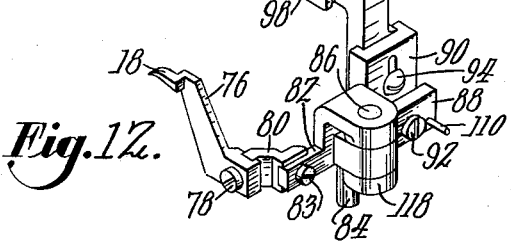

Oct. 4, 1960  E. QUINN  2,954,748
MACHINES FOR FASTENING STRIPS TO OTHER WORK
Filed Nov. 13, 1956  11 Sheets-Sheet 6
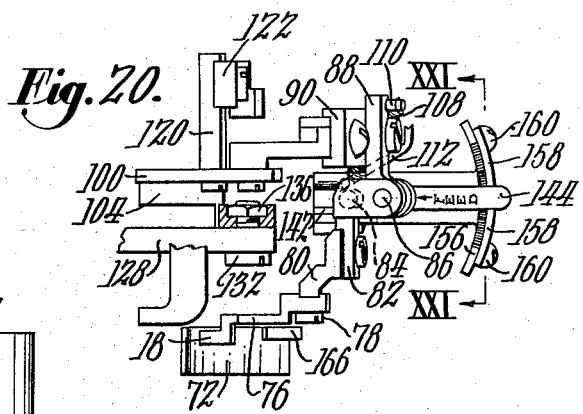
Inventor
Edward Quinn
By his Attorney

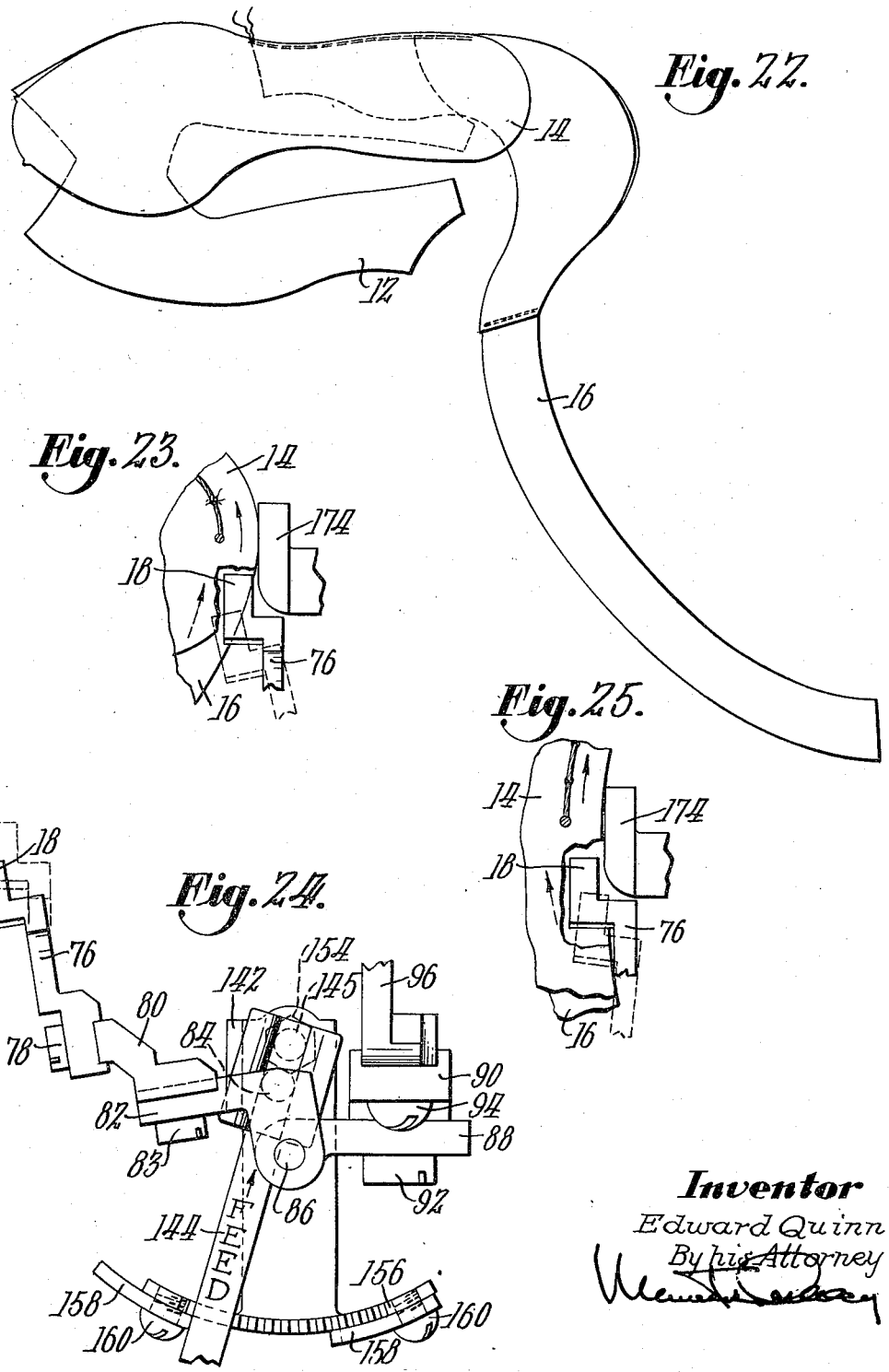

Oct. 4, 1960  E. QUINN  2,954,748
MACHINES FOR FASTENING STRIPS TO OTHER WORK
Filed Nov. 13, 1956  11 Sheets-Sheet 8

Inventor
Edward Quinn
By his Attorney

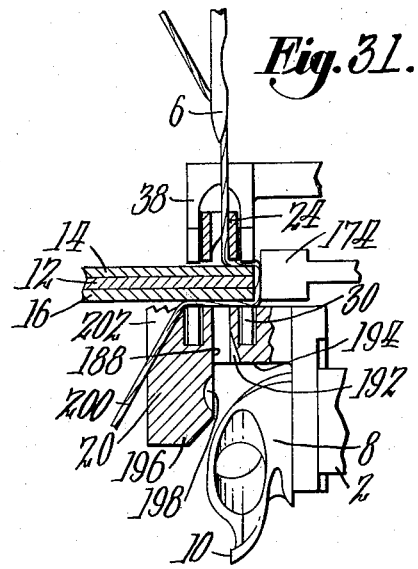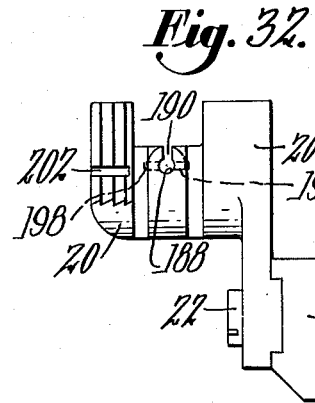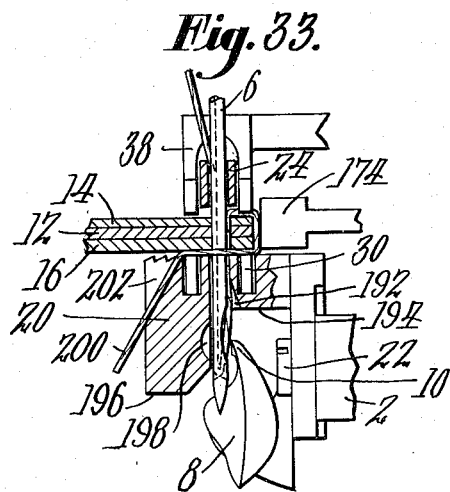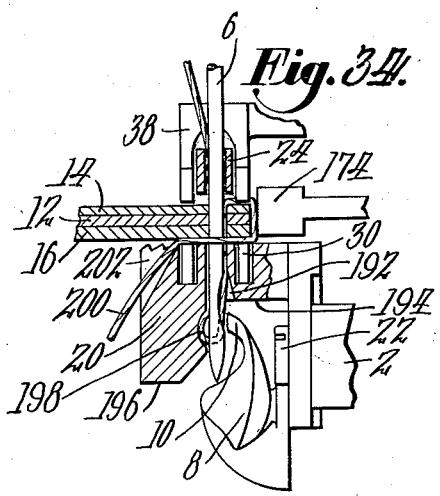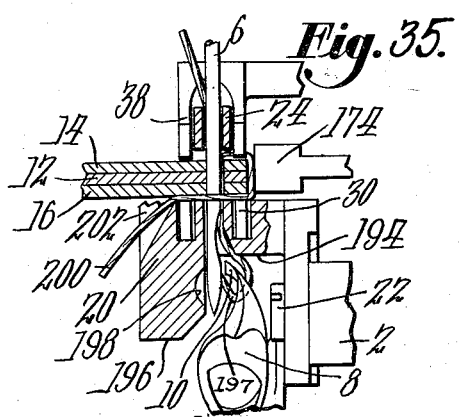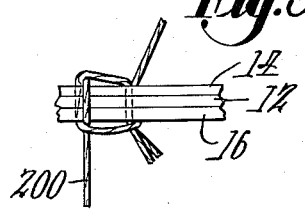
*Inventor*
Edward Quinn
By his Attorney Oct. 4, 1960

E. QUINN 2,954,748

MACHINES FOR FASTENING STRIPS TO OTHER WORK

Filed Nov. 13, 1956

*Inventor*
Edward Quinn
By his Attorney

Oct. 4, 1960  E. QUINN  2,954,748
MACHINES FOR FASTENING STRIPS TO OTHER WORK
Filed Nov. 13, 1956  11 Sheets-Sheet 11
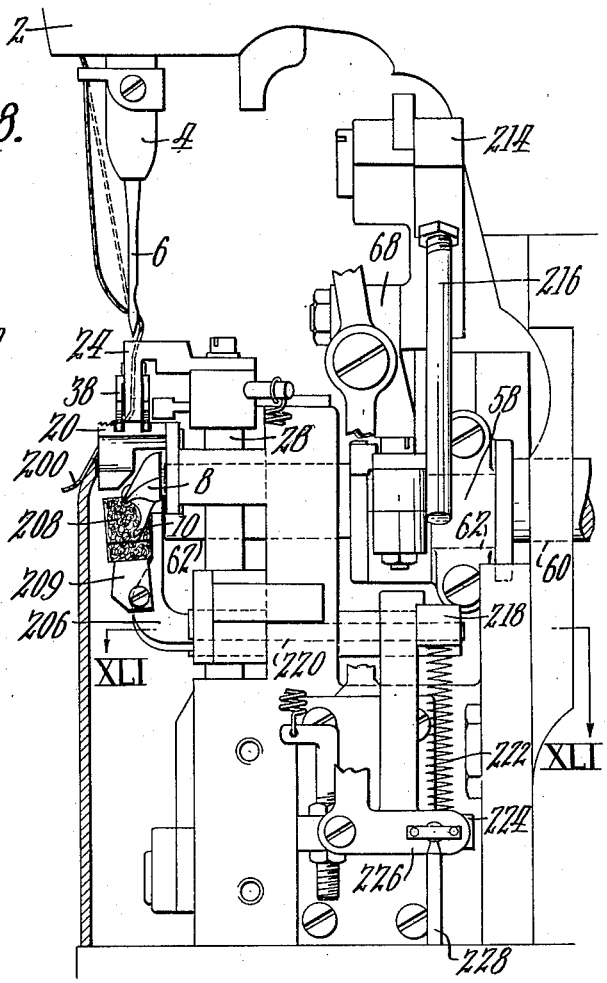
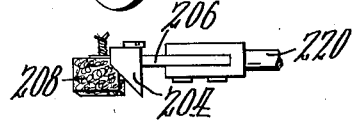
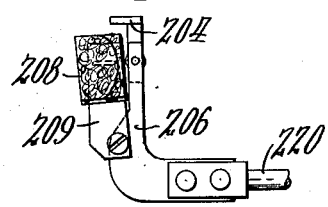
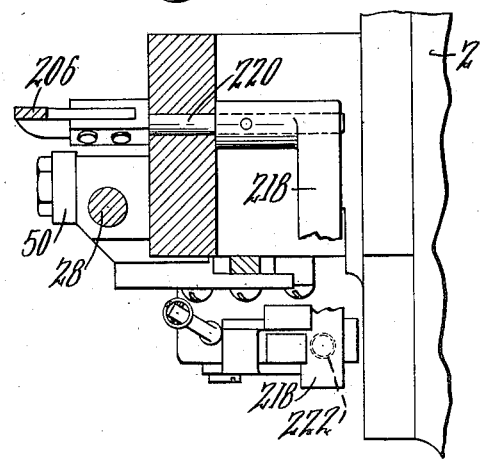
Inventor
Edward Quinn
By his Attorney

United States Patent Office 2,954,748
Patented Oct. 4, 1960

2,954,748

MACHINES FOR FASTENING STRIPS TO OTHER WORK

Edward Quinn, Saugus, Mass., assignor to United Shoe Machinery Corporation, Flemington, N.J., and Boston, Mass., a corporation of New Jersey Filed Nov. 13, 1956, Ser. No. 621,796

9 Claims. (Cl. 112—46)

This invention relates to improvements in slip-lasted shoe fastening and assembling machines similar to that disclosed in an application for United States Letters Patent, Serial No. 503,904, filed April 26, 1955, now Patent No. 2,905,118, dated September 22, 1959, in my name.

The machine of the prior application above identified, is intended to operate upon shoe parts cut with patterns having different curvatures. The shoe parts operated upon ordinarily include an upper, a sock lining, and a platform cover or wrapper strip, the latter of which is led through a wrapper strip pilot for guiding it automatically into the operating point of the machine while the other parts are flexed manually to bring their edges into register without the benefit of a last for supporting them in properly diverging relationship. The wrapper strip pilot of the prior machine consists of a pair of wrapper strip gripping rolls so mounted that they draw the wrapper strip edgewise and prevent its escape from the sewing point. It has been found that under some circumstances the grip of the pilot rolls impresses undesirable frictional resistance on the strip as it moves toward the operating point, to such an extent that the strip is stretched beyond its elastic limit, imparting a faulty configuration and an objectionable appearance to a completed shoe.

One object of the present invention is to avoid excessive distortion in a wrapper strip directed automatically into a slip-lasted shoe sewing machine of the type referred to, by the provision of a strip overfeeding device which will comply with the dimensional limitations and other requirements of such machines. Accordingly, a feature of the invention fulfilling this object resides in a particularly desirable adaptation of a wrapper strip overfeeding device including an advancing member guided toward and from the point of operation on a slip-lasted shoe, the machine having a main shaft, devices actuated by the main shaft for feeding and for fastening one edge of the strip to other work parts, a work support and a presser foot acting to clamp the strip and work on the work support beyond the overfeeding device, and an edge gage at one side of the point of operation of the fastening devices to guide the strip while being fed. A novel aspect of the wrapper strip overfeeding device resides in actuating the strip advancing member to bulge the strip away from the work support between the advancing member and the presser foot, so that the presser foot in clamping the work compresses the strip lengthwise in advance of the operating point in the machine. Preferably, the machine has, in advance of its operating point, a ramp along which the strip passes at an obtuse angle to the work-engaging surface of the work support and the strip advancing member is of claw-like construction and moves along the ramp with a greater stroke than the length of feed imparted by the feeding devices to form the bulge in the strip.

Other objects of the invention are to improve the operations of a fastening machine of the thread sewing type, to such an extent that extremely uniform and reliable results are obtainable in spite of the use of a wrapper strip overfeeding device or of practices of work positioning which introduce reaction forces of greater intensity than are usual, tending to disturb the uniformity of operation. The features of the invention relating to the objects last noted include the provision of a sewing needle reinforcing block having a bore for confining the needle, a loop deflecting notch intersecting the wall of the bore and an outer surface of the reinforcing block, the notch having an opening at the side nearest the loop taker to guide each loop of thread as it is opened by the loop taker and to bulge it toward the loop taker so that the loop taker will enter the loop with certainty, to novel and improved thread end locating means and to a novel and improved automatic lubricator for the loop taker.

These and other features of the invention, as hereinafter described and claimed, will more readily be understood from the following detailed description, taken in connection with the accompanying drawings, in which:

Fig. 3 is a sectional detail view taken in left side elevation of a portion of a work clamp, a wrapper strip overfeeding device, and some of the mechanisms for actuating them shown in stopped positions of the machine;

Fig. 4 is a sectional plan view of the clamp and overfeed actuating mechanisms shown in Fig. 3, taken along the line of IV—IV of that figure;

Fig. 5 is a detail plan view on an enlarged scale showing an eccentric connection on a sewing shaft in the overfeed mechanism;

Fig. 6 is a detail view in left side elevation of the overfeed actuating mechanism for the wrapper strip, looking from the left side of the machine with the parts shown in positions somewhat advanced from those of Fig. 3;

Fig. 7 is a perspective detail view of a right-angle link in the overfeed mechanism;

Fig. 8 is a detail view in left side elevation and partly in section of a driving eccentric and an actuating finger connected to the overfeed device, shown in positions still further advanced from Fig. 6;

Fig. 9 is a detail view showing work clamping and feeding devices together with the wrapper strip overfeeding device;

Fig. 10 is a sectional detail view taken along the line X—X of Fig. 9;

Fig. 11 is a sectional detail view taken along the line XI—XI of Fig. 9, indicating the position of a wrapper strip as it is being fed to the sewing point in the machine;

Fig. 12 is a perspective detail view of the wrapper strip overfeeding device;

Fig. 13 is a detail view on a reduced scale, taken in front elevation, showing a set of control connections for rendering the wrapper strip overfeeding device inoperative when the machine is brought to rest at the end of a seam;

Fig. 14 is a detail view in left side elevation showing the manner of operation of the overfeeding device;

Fig. 15 is a similar view on an enlarged scale illustrating the manner in which the overfeeding device operates;

Fig. 16 is a sectional detail view taken along the line XVI—XVI of Fig. 15;

Fig. 17 is a similar view of the parts shown in Fig. 15, illustrating the manner in which a wrapper strip is compressed lengthwise during the operation of the machine;

Fig. 18 is a sectional detail view in left side elevation of the overfeed actuating mechanism, shown in a position advanced slightly beyond that indicated by the position of the eccentric in Fig. 8, the overfeed device being illustrated at the beginning of its overfeeding movement;

Fig. 19 is a similar detail view of the driving eccentric for the overfeed device, shown in the same position as in Fig. 18;

Fig. 20 is a plan view of the parts shown in Fig. 18;

Fig. 21 is a detail view in front elevation and partly in section of a portion of the overfeed mechanism, as viewed along the line XXI—XXI of Fig. 20;

Fig. 22 is a view of a set of shoe parts in the process of being sewn together;

Fig. 23 is a detail plan view of a set of convexly curved shoe parts along their toe portions, illustrating the action of the overfeed mechanism;

Fig. 24 is a detail plan view of a portion of the overfeed actuating mechanism shown in Fig. 18;

Fig. 25 is a detail view similar to that of Fig. 23 with the overfeed mechanism acting along a concavely curved shank portion of a shoe;

Fig. 31 is a sectional detail view in front elevation of the loop taker and the feeding and nonfeeding work clamps, illustrating the manner of operation of the improved thread locating groove shown in Fig. 27;

Fig. 32 is a detail plan view of the nonfeeding work support;

Fig. 33 is a sectional view in front elevation of the same parts illustrated in Fig. 31, showing the operation of the thread locating means after the needle has penetrated the work during formation of the first stitch in a seam;

Fig. 34 is a similar view showing the manner of operation of a thread storage indentation in a needle guide as the needle starts to retract from the work;

Fig. 35 is a similar view of the same parts showing how the loop is forced through the needle eye into a path of the loop taker at a position in a sewing cycle later than that illustrated in Fig. 34;

Fig. 36 is a side detail view of the shoe parts showing the position of the thread end at the beginning of a seam;

Fig. 38 is a sectional detail view in front elevation with certain parts removed to expose the looper lubricating device;

Fig. 39 is a detail plan view of the looper lubricating device;

Fig. 40 is a detail view in front elevation of the looper lubricating device; and Fig. 41 is a sectional plan view of the parts for supporting the looper lubricating device, as viewed from the line XLI—XLI in Fig. 38.

Figure 1:
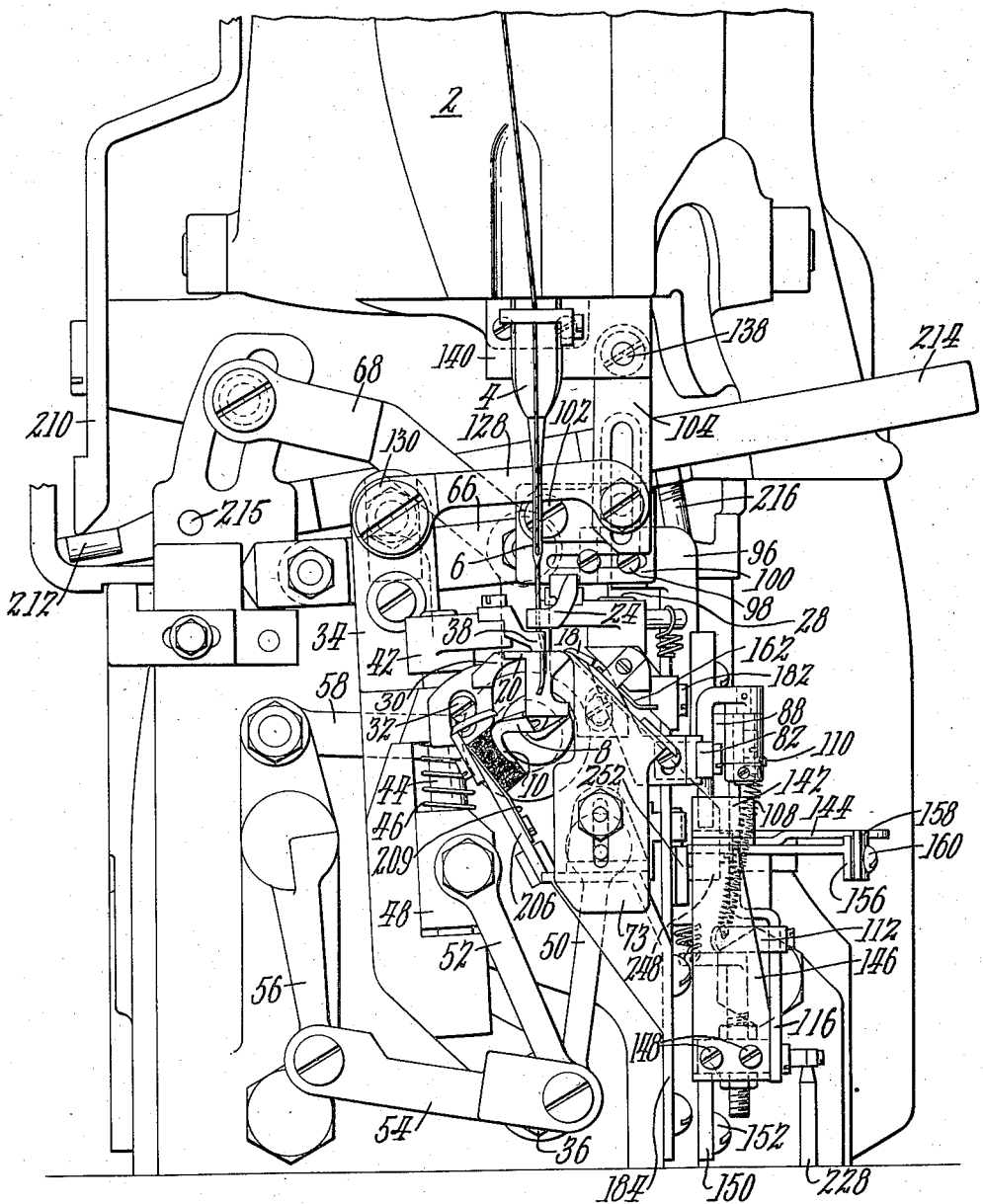
Fig. 1 is a view in left side elevation of portions of a slip-lasted shoe sewing machine, embodying features of the present invention.

The machine illustrated in the drawings is a straight eye-pointed needle chain-stitch sewing machine of the Wilcox and Gibbs type, similar to that disclosed in my application for patent above identified. The machine has a main sewing head frame 2, within which is mounted a vertically reciprocating needle bar 4 at the lower end of which the needle, indicated at 6, is clamped. Co-operating with the needle is a looper or loop taker 8 acting with other stitch-forming devices corresponding to those described in the prior application to form a chain stitch seam. To form the stitches the looper has a loop entering beak 10, which moves in a circular path across the needle. After taking the loop off the needle the loop taker withholds the loop as the needle withdraws from the work and, during the next penetrating stroke of the needle, the withheld loop is enchained with that carried by the needle through the work.

The machine is intended to operate upon superposed marginal portions of a shoe upper 12, a sock lining 14, and a platform wrapper strip 16 (see Figs. 15 and 17). During assembling and stitching operations of a slip-lasted shoe, the parts are flexed and caused to diverge through different angular displacements about the line of the seam inserted by the machine. Flexure of the upper and sock lining is accomplished manually by the operator who directs the parts, one with each hand, in advance of the point of operation of the needle in the machine. In order to direct the platform wrapper strip 16 it is guided automatically through a wrapper strip advancing pilot, including an overfeed member acting with an orbital feeding movement.

The wrapper strip advancing member, according to an important feature of the invention, co-operates in a novel and particularly advantageous manner with work-clamping and feeding devices in the sewing machine to overfeed the strip into the stitching point in the machine along a marginal portion of the strip outside the line of the seam being inserted (see Figs. 23 and 25). The strip advancing member comprises a finger or claw 18, best shown in Figs. 14 and 16. The claw 18 is guided for movement toward and from the point of operation of the stitch-forming devices with a strip advancing movement greater than the length of feed imparted to the shoe parts by the feeding clamp to bulge the strip in such a way that it is compressed lengthwise by the work-clamping devices and stitched in this relation to the upper and sock lining of the shoe being assembled.

As in the machine of the prior application, the work clamping and feeding devices consist of a feed clamp connected to a carrier for actuating it while gripping the work and a nonfeeding work clamp connected directly to the frame 2 of the machine. Referring to Figs. 1, 26, 27, and 30, it may be seen that the nonfeeding work clamp comprises a work support block or table 20 clamped for vertical adjustment by a screw 22 to a rearwardly projecting portion of the frame 2 and a presser foot 24 attached by a clamp screw 26 (Fig. 2) to the upper end of a vertically sliding bar 28 and arranged for downward clamping movement toward the work support (Fig. 1).

The work feeding clamp comprises a work feeding support or table 30 secured for vertical adjustment by a screw 32 to a carrier 34 pivoted for swinging movement on a bolt 36 passing loosely through it into a portion of the frame 2. Co-operating with the feeding work support is a feeding presser foot 38 secured by a screw 40 to a block 42 at the upper end of a vertically sliding bar 44 and arranged to act on the work throughout an area centered about the point of needle operation. The bar 44 slides in bearings in the carrier 34 and is pressed downwardly to grip the work by a compression spring 46 surrounding the bar 44 and acting between a bearing on the carrier and a block 48 secured to the bar 44, the feeding foot 38 being actuated in timed relation to the movements of the nonfeeding presser foot 24, alternately to clamp the work with a yielding pressure, first by the nonfeeding foot and then by the feeding foot. The mechanism for actuating the presser feet alternately to clamp the work and to release it is more fully described in my prior application and includes, briefly, a pair of links 50 and 52, a link 54 connecting a central joint between the links 50 and 52 with a pivot in the lower arm of a lever 56 and a connecting rod 58 extending between the upper arm of the lever 56 and an eccentric 60 (see Fig. 3) on a main sewing shaft 62, the connecting rod 58 having formed at its forward end a strap surrounding one portion of the eccentric 60. The arrangement of the work feeding clamp is such that the presser foot 38 clamps the work along the line of work feed beyond the location of the nonfeeding presser foot 24 to hold the wrapper strip while being compressed by the non-feeding foot.

To impart a work feeding movement to the feeding clamp, comprising the work support 30 and the presser foot 38, mechanism is provided similar to that disclosed in the prior patent application. This mechanism includes a right angle arm 64 (Fig. 4) secured to the upper end of the carrier 34, to which is pivotally connected a link 66, in turn pivotally connected between a feed adjusting link 68 and a connecting rod 70 (see Fig. 6), the lower end of which rod is formed with a strap surrounding the portion of the eccentric 60 not occupied by the connecting rod 58.

Figure 28:
Fig. 28 is a plan view of a work feeding and a non-work feeding presser foot in the machine.
Figure 30:
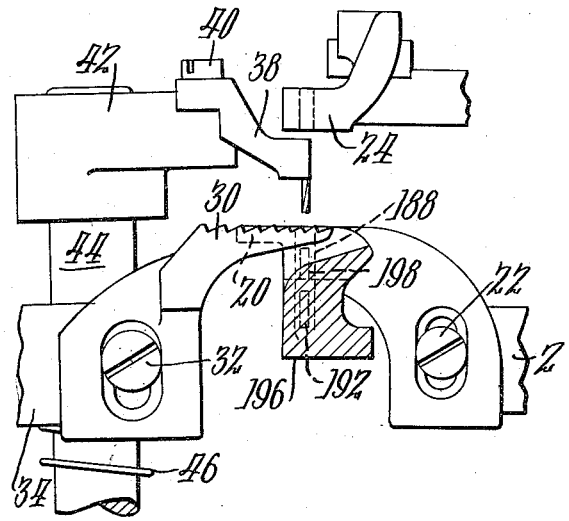
Fig. 30 is a sectional detail view in left side elevation of the parts shown in Fig. 27.
Figure 29:
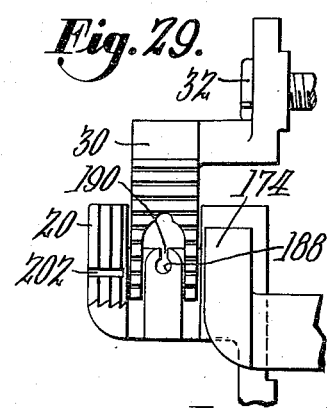
Fig. 29 is a plan view of a feeding and a nonfeeding work support which co-operate with the presser feet of Fig. 26 to form feeding and nonfeeding work clamps.
Figure 37:
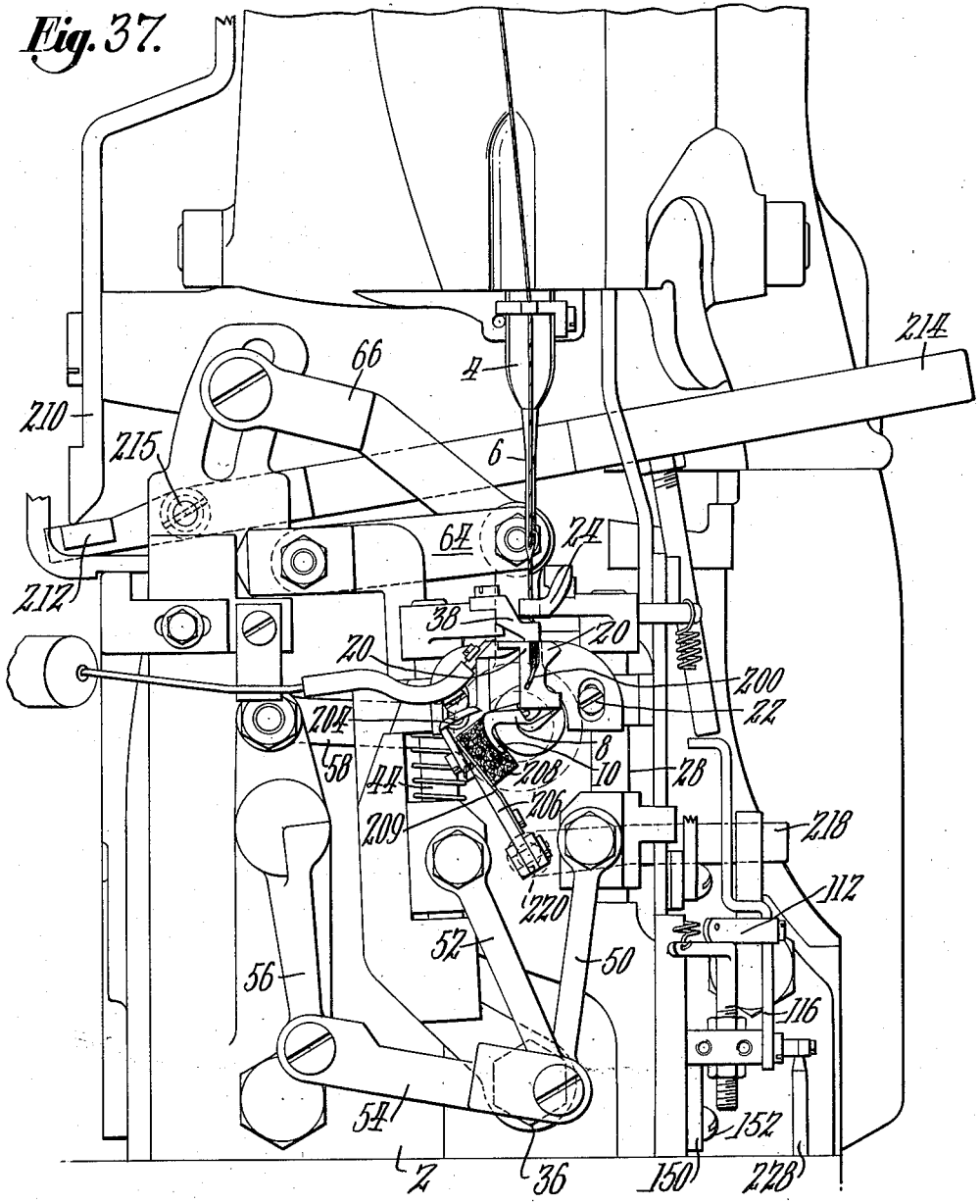
Fig. 37 is a view in left side elevation and on a reduced scale of a portion of the machine, illustrating a looper lubricating device.

The work feeding clamp actuating mechanism causes the presser foot to have imparted to it a 4-motion feeding movement, as illustrated by the broken outlines "a," "b," and "c," and the solid outline of the work feeding presser foot 38, which represents the fed position thereof in Fig. 17. Thus, the presser foot 38 after the work is fed moves to the position "a" to release the work, back feeds to the position "b," and then clamps the work at a new location at the position "c." During the back feeding and feeding movements of the feeding foot 38 the feeding work support 30 moves forwardly and rearwardly but no vertical movement is imparted thereto. The work feeding clamp comprises the work support 30 and the presser foot 38 has forked work-engaging ends located in surrounding relation to the work-engaging surface of the nonfeeding clamp (see Figs. 27 and 28), the forked ends of the feeding support 30 being relatively narrow and moving within grooves of the nonfeeding work support 20. The nonfeeding presser foot 24 has a needle guiding bore which surrounds the point of operation of the needle to grip the work against a portion of the nonfeeding work support 20, which is formed as a block interrupted by a circular needle guiding bore alined with the needle guiding bore of the presser foot 24.

To insure that the wrapper strip will bulge uniformly and always in the same manner so that it will be compressed lengthwise by the work clamping devices to the same extent throughout the seam inserted, the strip passes along a ramp 72 (Fig. 9) before reaching the nonfeeding work support 20, the ramp having a surface inclined at an angle of 45° and formed by a right-angle flange on a plate 73. The ramp along which the strip passes is disposed at an obtuse angle, running upwardly with respect to the work-engaging surface of the work support, the arrangement being such that a maximum bulge in the strip takes place along its marginal portion between the wrapper strip advancing claw 18 and the feeding presser foot 38, the wrapper strip being clamped by the feeding presser foot 38 against the feeding work support 30 at this time. As the nonfeeding presser foot 24 engages the bulge, indicated at 74 (Fig. 15), in the wrapper strip, it is flattened into the position shown in Fig. 17 and compressed in a lengthwise direction during the next succeeding work penetrating stroke of the needle, the thread carried through the work assisting in retaining the wrapper strip in flattened condition and preventing release of the lengthwise compression imparted to the wrapper strip during the clamping action of the nonfeeding foot.

Bulging the wrapper strip away from the nonfeeding work support 20, as shown in Fig. 15 causes the upper and sock lining of the shoe also to be raised somewhat in advance of the point of the needle operation, the parts beyond the point of needle operation being secured by the feeding foot 38 as well as by the completed stitches against displacement from each other. As the nonfeeding foot 24 descends from the position of Fig. 15, the clamping action of the foot 24 in flattening the bulge 74 of the wrapper strip transfers the compressing strains along the strip in the direction of work feed toward the sewing point. In this way the full intensity of the compressing strains in the strip are retained during the work penetrating stroke of the needle, especially while operating about the convexly curved edges of the parts. As the seam progresses the wrapper strip will be fastened to the edges of the upper parts with greater lengthwise compression along the seam line than along the free edge of the strip. Accordingly, when a platform sole is applied to the sock lining of a completely sewn shoe and the wrapper strip is carried about the edges of the platform sole in completing the shoe, the strip will be conformed more readily to the curvatures with the platform sole edge and will fit the sole edge without causing deformity or excessive distension in any of the shoe parts.

The claw 18 in overfeeding the wrapper strip 16 is given an orbital motion in a triangular path, both feeding and back feeding in accurate timed relationship with movements of the work-feeding foot 38. Referring more particularly to Figs. 15 and 17 and starting with the solid line position of the claw 18, the work-feeding foot 38 also assumes its solid line work-clamping position of Fig. 17. After the feeding foot 38 disengages from the work by moving vertically to the broken line position "a" (Fig. 17), the claw also is back fed horizontally to its broken line position "a" to disengage the wrapper strip. The claw then is back fed while out of engagement with the work and eventually to the broken line position "b" (Fig. 17) while descending into a strip re-engaging position. During these disengaging, back feeding, and re-engaging movements of the claw, the wrapper strip is retained in a position against lateral displacement, out of line with the point of needle operation.

For actuating the claw 18 through its feeding and back feeding movements, it is supported by an integral arm 76 from which it projects with an offset to the left (see Figs. 4 and 12). The arm 76 has a lower flattened portion provided with a vertical slot through which a clamping screw 78 passes into threaded engagement with an angular fixture 80 to which it is secured for vertical adjustment. The fixture 80 is clamped to a horizontal arm of a lever 82 (Fig. 2) by a screw 83 passing through the arm of the lever into a grooved end of the fixture. The lever 82 has an integral downwardly extending rod portion 84 (Fig. 6) formed at its upper end with an offset hub surrounding the upper end of a vertical spindle 86 (Fig. 4) to which it is pinned. The central portion of the spindle is rotatable in a block 88 formed with a flange clamped to a plate 90 (see Figs. 2 and 4), by a screw 92 passing through the flange of the block 88 and into threaded engagement with the plate 90. The plate 90 in turn has at its upper end a vertical slot through which a screw 94 passes into threaded engagement with the lower end of an angle bar 96 secured at its enlarged upper end by a screw 98 passing through a horizontal slot in a pivot plate 100.

The four interconnected members between the claw 18 and the pivot plate 100 described above all act as a single unit with a swinging motion about a pivot formed by a shoulder screw 102 passing loosely through a horizontal arm of a right-angle link 104 (Fig. 7) and into threaded engagement with the pivot plate 100. In swinging about the shoulder screw 102 the claw 18 moves toward and from the ramp 72, along the surface of which the wrapper strip passes in its course to the sewing point of the machine.

The claw 18 is held yieldingly against the wrapper strip on the 45° surface of the ramp 72 through the action of a tension spring 108 (see Fig. 2) stretched between a pin 110 on the block 88 and a clip 112 secured by a screw 114 to a lever 116, the purpose of which will be described hereinafter. The action of the spring 108 swings the claw 18 downwardly toward the 45° surface on the ramp about the shoulder screw 102 as a center. To prevent vertical displacement of the spindle 86 from the block 88, the lower end of the spindle below the block has secured to it a collar 118 (Figs. 6 and 12).

To disengage the claw 18 from the wrapper strip on the ramp at the end of the feeding movement of the claw the pivot plate 100 has secured to its central portion a block 120 (see Figs. 3, 4, and 12). The block 120 has a vertical groove within which is fitted a downwardly extending finger 122 and a screw 124 passing through a slot in the finger and into the block 120 secures the finger thereto. At its lower end the finger is formed with an inclined cam surface arranged to be engaged by a lateral projection 127 from a rectangular plate 126 secured to the connecting rod 68 (see Figs. 5 and 8). During the rising movement of the connecting rod 68 the projection 127 having an inclined surface engages the inclined surface on the finger 122 and lifts the entire assemblage of parts, including the claw 18, from the wrapper strip at the same time in which the work feeding foot 38 is raised from engagement with the work.

The feeding and back feeding movements of the claw 18 are impressed upon it through shaft driven mechanism including connections with the work feeding devices and the feed carrier 34. These connections include a link 128 pivoted at one end by a screw 130 to the upper end of the feed carrier 34 and at the other end by a screw 132 to the right-angle link 104. The screw 132 passes loosely through the link 128, through a vertical slot 134 in the link 104 and into a clamp nut 136 (Fig. 4) slidingly mounted in a vertical groove in the link 104. To prevent displacement of the screw, it has a shoulder seating with a gripping action against the link 104. Movement of the screw 132 by the link 128 causes the link 104 to swing about a screw 138 passing loosely through the upper end of the link 104 and into engagement with a fixed plate 140 secured to the frame 2 of the machine (Fig. 3). In swinging rearwardly about the screw 138 the link 104 carries with it the shoulder screw 102, moving the assemblage, shown in Fig. 12, of the parts 100, 96, 90, 88, 86, 82, 80 and 76 rearwardly, while the claw 18 is retained yieldingly in engagement with the wrapper strip on the ramp bracket 73, imparting a feeding movement to it. To impart a back feeding movement to the claw 18, the link 104 is swung forwardly about the screw 138 while the claw is raised from engagement with the wrapper strip.

In sewing certain types of shoes having abrupt curvatures it has been found desirable to change the path of movement of the strip advancing claw 18. By so doing, assistance is given to the operator in directing the strip automatically toward the point of needle operation in the machine. For instance, in sewing relatively high heel shoes having precut wrapper strips formed with abrupt convex curvatures along their edges, it may be found essential to change the path of movement of the claw 18 laterally, so that the strip will not be disengaged from the claw as the other parts of a shoe are swung during sewing.

In order to prevent disengagement of the strip from the advancing claw 18, and to enable the claw to move laterally to follow the curvature of the strip, the lower end of the rod 84 (see Figs. 2 and 6) is confined at opposite sides within a guideway of a block 142 made fast to an adjusting lever 144, shown more clearly in Figs. 1 to 4, inclusive, 6, 18, 20, 21, and 24. The adjusting lever 144 is operable during sewing, and has a downwardly extending threaded stud 145 at its rearward end (Fig. 6) passing loosely through a horizontal central portion of an angular plate 146. The plate 146 is secured by screws 148 (Fig. 1) to a right-angle bracket 150 secured by a screw 152 to the frame 2 of the machine.

The adjusting lever 144 is held in place on the bracket 146 by a nut 154 (Fig. 6) engaging the threaded stud 145 on the adjusting lever 144. Projecting forwardly from the plate 146 is a fixed arm carrying an arcuate sector 156 formed along its upper edge with a series of notches engaging the under surface of the adjusting lever 144 to retain it releasably in adjusted position. The arrangement of the stud on the adjusting lever, to which the nut 154 is threaded, is such, that at the end of the strip advancing movement of the claw 18, the rod 84 comes into vertical alinement with the stud. Thus, at the end of the strip advancing movement of the claw, the claw always reaches the same lateral position regardless of the position of the lever 144. The lateral position of the claw, however, is changed during its back feeding movement when the angular position of the adjusting lever 144 is shifted, the claw swinging about the vertical spindle 86 as a center during its lateral movement.

Figure 2:
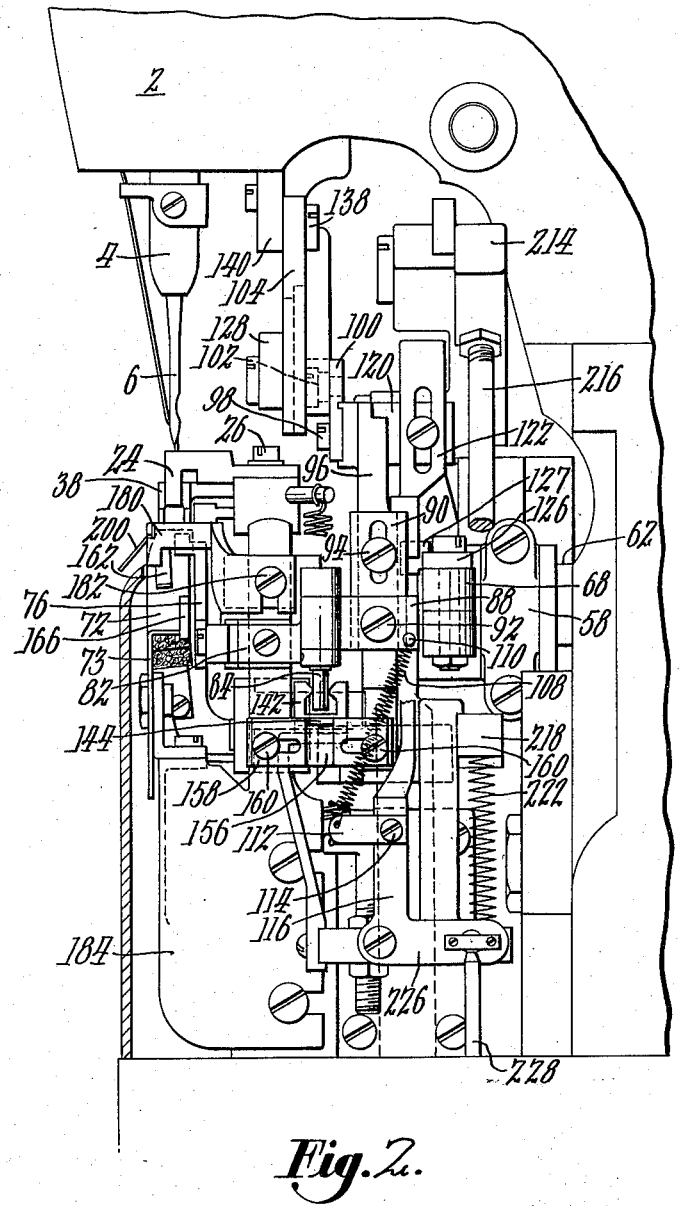
Fig. 2 is a view in front elevation of the parts surrounding the sewing point in the machine illustrated in Fig. 1, certain cover parts having been broken away and shown in section.
Figure 26:
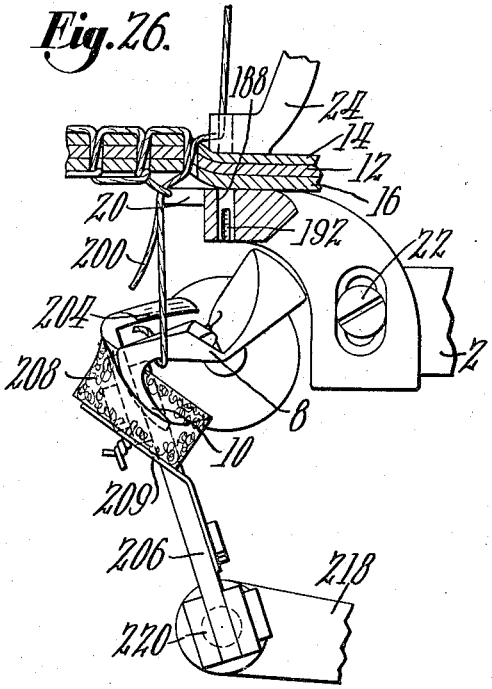
Fig. 26 is a detail view on an enlarged scale and in left side elevation of some of the work clamping and stitch-forming devices in the machine, including the lubricator for the loop taker looking from the left of the machine.
Figure 27:
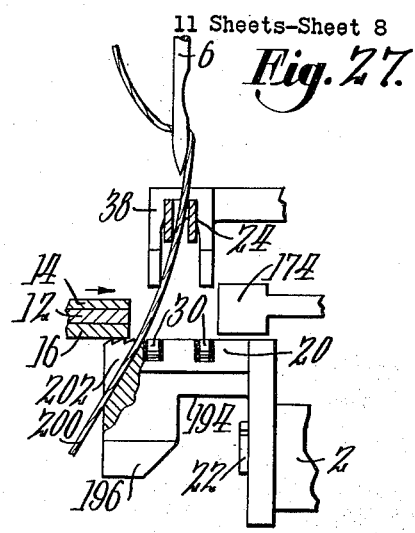
Fig. 27 is a detail view in front elevation partly broken away and in section showing the operation of a thread end locating groove for retaining the leading end of thread at a position where it will be gripped by the first completed stitch in a seam.

During normal operation of the machine when no lateral movement is to be impressed upon the claw 18, the lever 144 is moved and held in a central position on the sector 156 both by frictional engagement with the notches on the sector and by engagement of the sides of the lever by a pair of slotted stops 158 clamped to the front face of the sector 156 by screws 160 passing through the slots in the stops and into threaded holes in the sector 156. The lengths of the stops 158 and the spacing of the screws are such, that when the screws are loosened the stops are movable to positions in contact with the lever 144 where they hold the lever securely between them (Figs. 2 and 4). To enable sewing about a convexly curved portion of a wrapper strip the left hand stop 158 is shifted on its clamp screw away from the adjusting lever to a position indicated in Fig. 24, leaving the adjusting lever free to be moved toward the left. When moved toward the left the adjusting lever causes the strip advancing claw 18 to be actuated partially from the left to the right during sewing, from the broken line position of Fig. 23 to the solid line position rather than straight forwardly and rearwardly. In this way a convexly curved portion of the strip extending from the left toward the sewing point in the machine is continually engaged by the strip advancing claw as the claw moves with the strip toward the sewing point without permitting escape of the strip. To enable sewing about a concavely curved portion of a wrapper strip (Fig. 25) the claw is caused to be actuated partially from the right to the left in feeding the wrapper strip. This is accomplished by shifting the adjusting lever to the right of its central position, the stop 158 at the right having been adjusted on its screw 160 to accommodate the shift of the adjusting lever. If the stops 158 are secured in proper adjusted positions a shift of the lever 144 may be conveniently accomplished while the machine is running just in advance of the approach of the convexly or concavely curved portions of the strip.

As a further means to prevent lateral displacement of the claw 18 from the wrapper strip during disengagement and back feeding movement of the claw 18 while the adjusting lever 144 is maintained in its central position, according to this feature of the invention, the wrapper strip as it moves along the ramp 72 in advance of the claw 18 passes through a frictional device. The frictional device comprises a thin yielding plate 162 shown more clearly in Figs. 9, 10, 15 and 16. The yielding plate 162 has an upturned free end facing toward the oncoming wrapper strip as it approaches the stitching point. It is also formed with a sharpened lower edge corner 164 extending in the direction of strip movement to impart a widthwise directional force to the strip with a sled runner action. To enhance the widthwise directional action of the sharp corner 164 on the strip, there is formed integrally with the surface of the ramp plate 73, along which the strip passes in advance of the yielding plate 162, a rib 166 arranged between the edge gage and the plate to raise the marginal portion of the wrapper strip above the level of the remainder of the ramp. The rib forms a lengthwise reverse fold 168 (see Fig. 16) about the sharpened corner 164 of the plate 162. An upper left hand corner 170 (Fig. 11) of the rib also may be sharpened to improve the strip guiding action. To assist in the folding action the claw 18 is located opposite the rib and presses the strip against the rib during each advancing movement. By this construction the directional action on the strip is varied with the stiffness of the strip, so that the greater the stiffness the stronger the directional action is and the less likelihood there is for lateral displacement of the strip.

The yielding plate 162 together with the rib 166 also acts as a frictional device to impart a slight resistance to movement of the strip toward the sewing point in the machine and as the work feeding devices operate the overfeeding claw applies a widthwise force to the strip in a direction to bring it into line with the sewing point in the machine. In so doing the right edge, indicated at 172, of the strip (Figs. 11 and 16) is pressed uniformly against one side of the supporting arm 76 of the claw 18, which also serves as an edge guide. The side of the arm 76 is located in alinement with an edge gage 174 adjustably secured to the work-engaging surface of the work support at one side of the point of operation of the needle. The widthwise force of the wrapper strip, thus induced by the overfeeding and lengthwise compressing action of the claw 18 and by the frictional resistance of the yielding plate 162 on the wrapper strip, holds the strip from displacement from both the arm 76 and the edge gage 174, except for abruptly curving portions of the strip.

It has been found that if the sharpened corner 164 of the plate 162 is made exactly parallel to the movement of the wrapper strip along the arm 76 and the edge gage 174 there is a tendency for the arm during the back feeding movement of the claw 18 to raise the edge of the strip and curl it to an undesirable extent, so that the guiding action of the arm on the strip is lost. Accordingly, instead of mounting the plate 162 with its sharpened corner 164 extending exactly parallel to the wrapper strip movement it is inclined by a small angle, indicated at 176 in Fig. 11, diverging from the arm 76 in the direction of feeding movement. For most purposes, a diverging angle 176 of two or three degrees has been found effective to relieve the pressure of the strip edge against the arm 76 sufficiently to prevent curling or displacement of the strip edge against the arm. Not only does the diverging angle 176 prevent curling of the strip edge on the arm 76 but in case of rearward slippage of the strip during back feeding movement of the claw 18, a slight pressure, as a result of the inclination of the edge 164 is imparted to the strip to maintain it firmly in contact with the arm 76. Thus, rearward slippage of the strip, which occurs where the feeding movement of the claw 18 is greater than can be accommodated by lengthwise compression of the strip, will not cause displacement of the strip from the arm. Under these conditions any excessive amount of overfeed does not accumulate but is compensated for by rearward movement of the strip beneath the yielding plate 162.

To mount the yielding plate 162 above the ramp 72 it is formed with a vertically slotted tab through the slot of which passes a screw 178 (Figs. 9 and 10) engaging threads in a vertical flange of a cover 180 for protecting the directional overfeeding devices. Loosening the screw 178 enables the position of the plate to be adjusted in accordance with the thickness and stiffness of the wrapper strip operated upon. The cover 180 is constructed with an integral slotted lug engaged by a clamp screw 182 (see Fig. 2) received within a threaded opening in a frame bracket 184 (Figs. 1 and 2) of the machine.

When it is necessary to shift the adjusting lever 144 during operation of the machine to accommodate the curvature of the wrapper strip the action of the frictional device is relaxed. For this purpose it may be necessary to loosen the screw 178 and raise the plate 162 so that it does not press so strongly on a wrapper strip or the plate may be removed entirely.

The feature of the invention relating to the needle reinforcing block is partially disclosed in my prior application above referred to. The reinforcing block is best shown in Figs. 31 to 35, inclusive, of the present drawings, and, as in the machine of the prior application, is an integral part of the nonfeeding work support 20. The block is formed with a needle guiding and loop positioning bore 188 alined with the path of the needle and provides a guiding clearance for the needle equal to the thickness of the sewing thread. At the side of the needle with the completed stitches the block has an outlet slot 190 (Fig. 32) entering the bore and having a width narrower than the diameter of the needle.

To deflect the loop of thread carried through the work by the needle and to hold it in a position separated angularly about the needle from the outlet slot where the beak 10 of the looper 8 will enter uniformly and with certainty regardless of any rotation of the work about the axis of the needle or other variable factors, the inner wall of the bore 188 has a notch 192 (see Fig. 31) displaced toward the looper about the axis of the needle in an angular direction from the outlet slot 190 by approximately 90°. After the needle reaches the lower end of its work penetrating stroke it begins to retract and to open out the loop carried thereby into the notch. In this way the notch guides the loop toward the looper path and holds it in a position where the looper beak will enter with certainty.

The loop deflecting notch 192 intersects not only the wall of the bore in the reinforcing block but also an outer surface 194 at the under side of the block nearest the looper 8. Accordingly, the notch engages the thread in the loop above the path of the looper beak, while leaving the space below the surface 194 open for rotation of the looper. The beak 10 on the looper passes closely within a right angularly shaped recess formed by the intersection of the surface 194 and a projection 196 on the block 20 extending downwardly toward the looper from one edge of the needle confining bore 188 (see Fig. 34). The downward projection 196 on the block serves to engage the supply side of the loop of thread carried by the needle through the work and to force it into the path of the looper beak 10, through the needle eye as the needle retracts from the work as shown more clearly in Fig. 35.

With the use of certain types of stiff or resilient sewing thread, especially those containing synthetic fibers the pressure on the thread at the supply side of the needle produced by close proximity of the projection 196 produces such a sharp bend or kink in the thread at the eye of the needle that excessive friction of thread in the needle eye results. This kink is formed while the needle is penetrating the work and the heat of the needle from friction with the work causes the kink to remain, as illustrated at 197, and to resist further easy passage of the thread through the needle eye. To assist in forcing the kink 197 in the thread out of the eye of the needle the surface of the projection 196 along which the needle passes is provided with a thread storage indentation 198, in which a limited amount of thread is displaced from contact with the needle, closer to the eye of the needle than the deflecting notch 192 while the needle is rising from its maximum work penetrating position. With the use of the thread storage indentation 198 in the projection 196 the abrupt bend in the thread at the supply side of the needle is avoided, as illustrated in Fig. 34, and the thread is pushed easily through the needle eye (Fig. 35). During the retraction of the needle from the position of Fig. 34 and while a needle loop is being opened up for the beak 10 of the looper the thread within the storage indentation is gradually forced through the needle eye from the notch into the path of the looper beak without encountering any substantial frictional resistance during its passage through the needle eye.

In order to insure that the first stitch of a new seam will be formed and tightened in a satisfactory manner it has been found desirable to provide means for locating each leading end 200 (Figs. 2 and 31) of the thread supported loosely in the machine as new work is introduced. To this end thread locating means is provided in the block, forming the nonfeeding work support 20 to retain the leading end 200 at a position along the seam line in advance of the point of needle operation, where it will be gripped by the first completed stitch in the seam. For this purpose the block portion of the nonfeeding work support 20 has cut into its work-engaging surface a thread locating groove 202 extending at right angles to the line of the seam inserted, when viewed from above. The groove 202 is disposed at a position along the seam line slightly in advance of the point of needle operation (see Fig. 32). If the thread end 200 is held in the groove by the operator and the edge of the work pressed against the thread, then during the first stroke of the needle in a new seam a loop of thread is carried across the end 200 while the work is being fed a stitch length and the next succeeding stroke of the needle will carry a second loop through the work beyond the leading end 200, thus gripping the leading end against the work by the first completed stitch, as illustrated more clearly in Fig. 36. As the sewing progresses the leading thread end 200 is drawn from the groove 202 and continues with the work as it is fed, thereby forming a secure fastening for the leading thread end.

In the machine of the type indicated it may be desirable to treat the thread with an adhesive agent or the work material operated upon may be impregnated before sewing with a compound having adhesive qualities. In order to avoid the accumulation of the adhesive agent on the thread-engaging surface of the looper 8, to an extent which impedes the movement of each needle loop about the looper, it is common practice to apply a lubricant or a solvent manually to the looper from time to time as conditions demand.

As has been stated, an improved automatic lubricator has been provided for the looper in the illustrated machine, which automatic lubricator furnishes an adequate supply of lubricant to the beak 10 of the looper and any surplus is thereafter wiped by the passage of the thread loops from the beak and distributed over the other thread-engaging surfaces thereof. The improved automatic lubricator thus acts as a cleaner for the looper and is connected with a thread cutter provided in the machine to apply lubricant to the looper beak each time the thread cutter is actuated.

As in the prior application the thread cutter comprises a blade similar to that indicated at 204 (see Fig. 39) secured to a supporting arm 206. The blade 204 has a sharpened edge arranged to engage the inner side of a needle loop just after it is entered by the looper 8.

The lubricator for the looper comprises a compressible pad 208 of lubricant absorbent material mounted on a resilient arm 209 secured to the arm 206 for the thread cutter in such a position that it is movable toward and from the path of the looper beak 10. The position of the looper beak 10 when the machine is brought to rest enables it to form an indentation of sufficient depth in the absorbent material of the pad that a surplus quantity of lubricant is squeezed onto the beak. Because of the construction of the thread cutter knife blade 204, and for the reason that the knife blade enters into the path of the looper beak, it is essential that the machine be stopped with the looper beak in a position to be engaged by the lubricator. Thus, the looper beak is stopped at a position remote from the point where it first engages a loop of thread carried by the needle and lubricant is squeezed onto the looper beak whenever the cutter is actuated to sever the thread at the end of a seam.

To prevent squeezing movement of the pad against the looper except when the looper beak is in stopped position where it will engage the pad squarely, means are provided, similar to that disclosed in my prior application, for preventing accidental operation of the thread cutter, comprising a triple lockout, one division of which consists of a set of connections actuated by the needle bar 4. This set of connections is in the form of an arm 210, shown in Fig. 1, having at its lower end a cam surface engaging a roll 212 on a handle lever 214 fulcrumed on a fixed pin 215 and connected for actuating the thread cutter. The arm 210 is locked against movement at all times except when the needle bar 4 is in its highest position, as more fully described in inventor's prior application, above identified. The handle lever 214 also carries a rod 216 extending downwardly to a position to engage a thread cutter arm 218 (Fig. 38). The arm 218 is secured to a horizontal shaft 220 (Fig. 41) having at its left end an enlargement to which is riveted the thread cutter arm 206, the arm 218 being held raised normally by a compression spring 222 engaging a lug 224 on the machine frame. Only when the needle bar 4 is in its highest position is it possible by these connections to depress the handle lever 214 and to actuate the thread cutter and looper lubricator.

The second and third lubricator and thread cutter lockouts act to prevent depression of the handle lever 214 by movement of an arm on a lock lever 226 into the path of the rod 216, and another arm of the lock lever 226 beneath the cutter actuating arm 218, as more fully described in my prior application. A horizontal arm of the lock lever 226 is pivotally connected to the upper end of a link 228 actuated downwardly in starting the machine in operation. By these connections the lubricator and thread cutter may be actuated only after the machine is stopped in a predetermined position and before the machine is started in operation upon a new shoe or other work piece.

As in the machine of the prior application, the illustrated machine is provided with means for releasing the work from clamping engagement by the presser feet 24 and 38 after the machine is brought to rest and for raising the presser feet for conveniently introducing a new work piece. Means for raising the presser feet includes a vertical slide 230, best shown in Figs. 13 and 14, movable in a guideway 232 secured to the front side of the machine frame. The slide 230 is actuated through a link 234 pivotally connected between the upper end of the slide and a bell crank 236 rotatable on the frame of the machine. The bell crank 236 is connected through a link 238 with an arm 240 on a rotatable shaft 242 also carrying an arm 244 pivotally connected to a treadle actuated link 246. When it is desired to raise the presser feet from clamping engagement with the work, the treadle rod 246 is moved downwardly in the direction of the arrow in Fig. 13. At the same time that the presser feet are raised, the wrapper strip advancing claw 18 is raised from engagement with the wrapper strip on the ramp 72 to enable easy presentation of a new wrapper strip to the sewing point of the machine.

To raise the claw 18, the angle bar 96 of the claw assemblage (see Fig. 12) has its lower end beveled and is engaged by a wedge-shaped block 248 (see Fig. 14).

The block 248 has a vertical slot through which passes a clamp screw 250 engaging threads in a horizontal block 252 secured to the slide 230, the arrangement being such that when the slide 230 is raised, the wedge surface of the block 248 engages the beveled end of the bar 96 and swings the claw assemblage against the force of the spring 108 about the shoulder screw 102. When the treadle rod 246 is moved upwardly the wedge block 248 is lowered and disengaged from the angle bar 96, permitting the spring 108 to draw the claw 18 yieldingly into feeding engagement with a wrapper strip on the ramp 72.

The use of the wrapper strip advancing claw 18 is particularly desirable when operating upon strips composed of relatively soft, readily stretched material. While a wrapper strip guide including pilot rolls, similar to those of the prior application, is particularly desirable for wrapper strips of thicker, stiffer material, the advancing claw also is effective with such materials. Under certain conditions it may also be desirable to employ both the pilot rolls and the claw for directing a wrapper strip into the sewing point of the machine. With the use of both the pilot rolls and the advancing claw, the claw actuating mechanism is adjusted to move the strip under lengthwise compression through the rolls, and the work-feeding clamp of the machine then continues the movement of the strip into the sewing point. The principal advantage of the claw over the rolls, however, is that a positive compression of the strip may be accomplished when the bulge 74 (Fig. 15) is produced in the strip and flattened by the nonfeeding presser foot 24 during each sewing cycle. When both the pilot rolls and the strip advancing claw are utilized, connections for separating the pilot rolls, as well as for raising the advancing claw at the end of a seam are provided, similar to those disclosed in the prior application.

Certain features of the invention herein disclosed form the subject matter of a divisional application, Serial No. 790,244, filed January 30, 1959, relating to Thread Control and Lubricating Devices.

The nature and scope of the invention having been indicated, and particular embodiments having been described, what is claimed is:

1. A machine for manufacturing a slip-lasted shoe, said machine having a main shaft, devices actuated by the main shaft for feeding and fastening one edge of a wrapper strip to other work parts, including a work support, a presser foot acting toward and from the work support to clamp the work parts in advance of the point of operation of the fastening devices, and an edge gage on the work support, at one side of the point of operation of the fastening devices, against which edge gage the strip is pressed widthwise while being fed, in combination with an overfeeding wrapper strip advancing means also in advance of the point of operation of the fastening devices, guided for movement toward and from the point of operation of the fastening devices along a portion of the strip outside the line of the seam being inserted to enable the presser foot to compress the strip lengthwise in clamping the work parts against the work support.

2. A machine for manufacturing a slip-lasted shoe, said machine having a main shaft, devices actuated by the main shaft for clamping, feeding and fastening one edge of a wrapper strip to other work, and an edge gage at one side of the point of operation of the fastening devices, against which edge gage the strip is pressed widthwise into line with the fastening devices, in combination with an overfeeding wrapper strip advancing means guided for movement toward and from the point of operation of the fastening devices along a portion of the strip outside the line of the seam being inserted for bulging the strip a maximum amount along its marginal portion to cause it to be compressed in a lengthwise direction by the clamping devices in clamping the work.

3. A machine for manufacturing slip-lasted shoes, said machine having a main shaft, switch-forming devices actuated by the main shaft for feeding and attaching one edge of a wrapper strip to other work, a work support, a presser foot acting downwardly toward the work support to clamp the work against the work support, an edge gage on the work support at one side of the point of operation of the stitch-forming devices, against which edge gage the strip is pressed widthwise while being fed and a ramp along which the strip passes disposed at an obtuse angle running upwardly toward the work-engaging surface of the work support, in combination with means including a claw-like wrapper strip advancing member guided for movement along the ramp toward and from the point of operation of the stitch-forming devices along a portion of the strip outside the line of the seam being inserted for bulging the strip away from the work support between the claw-like member and the stitching point to enable the presser foot to compress the marginal portion of the strip lengthwise a maximum amount in clamping the work against the work support.

4. A machine for manufacturing slip-lasted shoes, said machine having a main shaft, stitch-forming devices actuated by the main shaft for feeding and attaching one edge of a wrapper strip to other work, a work support, a presser foot acting toward and from the work support to clamp the work against the work support, an edge gage on the work support at one side of the point of operation of the stitch-forming devices, against which edge gage the strip is pressed widthwise while being fed, and a ramp along which the strip passes disposed at an obtuse angle with the work-engaging surface of the work support, in combination with a claw-like strip advancing member guided for movement along the ramp toward and from the point of operation of the stitch-forming devices along a portion of the strip outside the line of the seam being inserted, and means driven by the main shaft to actuate the claw-like member in timed relation to the feeding devices with a strip advancing movement greater than the length of feed imparted to the strip by the feeding devices for bulging the marginal portion of the strip away from the work support between the claw-like member and the stitching point to enable the presser foot to compress the strip lengthwise a maximum amount in clamping the work against the work support.

5. A machine for manufacturing slip-lasted shoes, said machine having a main shaft, stitch-forming devices actuated by the main shaft for feeding and attaching one edge of a wrapper strip to other work, a work support, a presser foot acting toward and from the work support to clamp the work against the work support, an edge gage on the work support at one side of the point of operation of the stitch-forming devices, against which edge gage the strip is pressed widthwise while being fed and a ramp along which the strip passes disposed at an obtuse angle with the work-engaging surface of the work support, in combination with a claw-like strip advancing member guided for movement along the ramp toward and from the point of operation of the stitch-forming devices, means driven by the main shaft to actuate the claw-like member in timed relation to the feeding devices with a strip advancing movement greater than the length of feed imparted to the strip by the feeding devices for bulging the strip away from the work support between the claw-like member and the stitching point to enable the presser foot to compress the strip lengthwise in clamping the work against the work support, frictional means engaging the strip on the ramp in advance of the claw-like member for urging the strip in a widthwise direction beneath the claw-like member and a rib on the ramp located opposite to the claw-like member to cause the claw-like member to press the strip against the rib and to form a reverse fold in the strip about the frictional means during each advancing movement.

6. A machine for manufacturing slip-lasted shoes, said machine having a main shaft, stitch-forming devices actuated by the main shaft for feeding and attaching one edge of a wrapper strip to other work, a work support, a presser foot acting toward and from the work support to clamp the work against the work support, an edge gage on the work support at one side of the point of operation of the stitch-forming devices, against which edge gage the strip is pressed widthwise while being fed and a ramp along which the strip passes disposed at an obtuse angle with the work-engaging surface of the work support, in combination with a claw-like strip advancing member guided for movement along the ramp toward and from the point of operation of the stitch-forming devices, means driven by the main shaft to actuate the claw-like member in timed relation to the feeding devices with a strip advancing movement greater than the length of feed imparted to the strip by the feeding devices for bulging the strip away from the work support between the claw-like member and the stitching point to enable the presser foot to compress the strip lengthwise in clamping the work against the work support, a frictional means comprising a plate formed with a sharpened edge corner extending in the direction of strip movement to impart a widthwise force to the strip, and a rib on the ramp to form a reverse fold in the strip about the sharpened corner of the plate.

7. A machine for manufacturing slip-lasted shoes, said machine having a main shaft, stitch-forming devices actuated by the main shaft for feeding and attaching one edge of a wrapper strip to other work, a work support, a presser foot acting toward and from the work support to clamp the work against the work support, an edge gage on the work support at one side of the point of operation of the stitch-forming devices, against which edge gage the strip is pressed widthwise while being fed and a ramp along which the strip passes disposed at an obtuse angle with the work-engaging surface of the work support, in combination with a claw-like strip advancing member guided for movement along the ramp toward and from the point of operation of the stitch-forming devices, means driven by the main shaft to actuate the claw-like member in timed relation to the feeding devices with a strip advancing movement greater than the length of feed imparted to the strip by the feeding devices for bulging the strip away from the work support between the claw-like member and the stitching point to enable the presser foot to compress the strip lengthwise in clamping the work against the work support, a frictional means engaging the strip on the ramp in advance of the claw-like member for urging the strip in a widthwise direction beneath the claw-like member, and a second presser foot for clamping the work along the line of work feed beyond the location of the first-mentioned presser foot to hold the strip while being compressed by the first-mentioned presser foot.

8. A machine for manufacturing a slip-lasted shoe, said machine having a main shaft, devices actuated by the main shaft for feeding and fastening one edge of a wrapper strip to other work parts, including a work support, a presser foot acting toward and from the work support to clamp the work parts in advance of the point of operation of the fastening devices, and an edge gage on the work support, at one side of the point of operation of the fastening devices, against which edge gage the strip is pressed widthwise while being fed, in combination with an overfeeding strip advancing means also in advance of the point of operation of the fastening devices, guided for movement toward and from the point of operation of the fastening devices to enable the presser foot to compress the strip lengthwise in clamping the work parts against the work support, and means for adjusting the movement of the strip advancing means laterally to prevent disengagement of the strip from the strip advancing means.

9. A machine for manufacturing a slip-lasted shoe, said machine having a main shaft, devices actuated by the main shaft for feeding and fastening one edge of a wrapper strip to other work parts, including a work support, a presser foot acting toward and from the work support to clamp the work parts in advance of the point of operation of the fastening devices, and an edge gage on the work support at one side of the point of operation of the fastening devices, against which edge gage the strip is pressed widthwise while being fed, in combination with an overfeeding strip advancing means also in advance of the point of operation of the fastening devices, guided for movement toward and from the point of operation of the fastening devices to enable the presser foot to compress the strip lengthwise in clamping the work parts against the work support, means for adjusting the movement of the strip advancing means laterally to prevent disengagement of the strip from the strip advancing means, and stops for limiting the adjustment for lateral movement of the overfeeding means.

References Cited in the file of this patent

UNITED STATES PATENTS

| | | |
|---|---|---|
| 1,080,877 | Ashworth | Dec. 9, 1913 |
| 1,952,772 | Newhall | Mar. 27, 1934 |
| 2,064,982 | Krag | Dec. 22, 1936 |
| 2,152,766 | Lewin | Apr. 4, 1939 |
| 2,192,166 | Ashworth | Mar. 5, 1940 |
| 2,201,060 | Terzian | May 14, 1940 |
| 2,311,222 | Galkin | Feb. 16, 1943 |
| 2,331,366 | Ashworth | Oct. 12, 1943 |
| 2,442,222 | Uccellini | May 25, 1948 |
| 2,564,678 | Dilger | Aug. 21, 1951 |
| 2,648,302 | Pearsall | Aug. 11, 1953 |
| 2,692,567 | Goreham | Oct. 26, 1954 |
| 2,705,464 | Eastman | Apr. 5, 1955 |
| 2,731,929 | Ayres | Jan. 24, 1956 |